US012526574B2

(12) United States Patent
Enamito et al.

(10) Patent No.: US 12,526,574 B2

(45) Date of Patent: Jan. 13, 2026

(54) SOUND PICKUP DEVICE, STORAGE MEDIUM AND METHOD

(71) Applicant: KABUSHIKI KAISHA TOSHIBA, Tokyo (JP)

(72) Inventors: Akihiko Enamito, Kawasaki Kanagawa (JP); Takahiro Hiruma, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 272 days.

(21) Appl. No.: 18/488,589

(22) Filed: Oct. 17, 2023

(65) Prior Publication Data

US 2024/0323599 A1 Sep. 26, 2024

(30) Foreign Application Priority Data

Mar. 20, 2023 (JP) ................................ 2023-044535

(51) Int. Cl.
*H04R 3/00* (2006.01)
*H04R 1/40* (2006.01)

(52) U.S. Cl.
CPC ............. *H04R 1/406* (2013.01); *H04R 3/005* (2013.01)

(58) Field of Classification Search
CPC ................................ H04R 3/005; H04R 1/406
See application file for complete search history.

(56) References Cited

U.S. PATENT DOCUMENTS

| | | | | |
|---|---|---|---|---|
| 11,295,755 | B2 | 4/2022 | Washio et al. | |
| 2019/0069083 | A1* | 2/2019 | Salehin | H04R 3/005 |

FOREIGN PATENT DOCUMENTS

| | | | |
|---|---|---|---|
| JP | H9-222352 | A | 8/1997 |
| JP | 2000-152372 | A | 5/2000 |
| JP | 2007-6253 | A | 1/2007 |
| JP | 2008-79256 | A | 4/2008 |
| JP | 2009-239346 | A | 10/2009 |
| JP | 2009-239349 | A | 10/2009 |
| JP | 2011-203048 | A | 10/2011 |
| JP | 2020-24338 | A | 2/2020 |
| JP | 2023-26927 | A | 3/2023 |
| JP | 2023-136981 | A | 9/2023 |

OTHER PUBLICATIONS

Tsutomu Kaizuka et al., "Controlling a distance from linear loudspeaker arrays to a listening point by using tangent line method," JASA Express Lett., vol. 1, pp. 072801-1 to 072801-8 (2021).

* cited by examiner

*Primary Examiner* — Ammar T Hamid

(74) *Attorney, Agent, or Firm* — Finnegan, Henderson, Farabow, Garrett & Dunner, LLP

(57) ABSTRACT

A sound pickup device includes a processor with hardware. The processor calculates a first relational expression between acoustic filter factors of acoustic filters applied to microphone acquisition signals acquired by two or more microphones, based on a multiplication factor at a sensitization control point with high sound pressure sensitivity by the two or more microphones and a transfer function between each of the two or more microphones and the sensitization control point. The processor calculates a second relational expression between the acoustic filter factors, based on information of a frequency of a sound source and an interval between the two or more microphones. The processor calculates each of the acoustic filter factors, based on the first relational expression and the second relational expression.

7 Claims, 14 Drawing Sheets

SOUND PICKUP DEVICE, STORAGE MEDIUM AND METHOD

CROSS-REFERENCE TO RELATED APPLICATION

This application is based upon and claims the benefit of priority from prior Japanese Patent Application No. 2023-044535, filed Mar. 20, 2023, the entire contents of which are incorporated herein by reference.

FIELD

Embodiments described herein relate generally to a sound pickup device, a storage medium and a method.

BACKGROUND

A technology to detect the position of an object by detecting sounds emitted from the object using a microphone is known. If the object is surrounded by a plurality of sound sources, the microphone is likely to detect ambient sounds as well as sounds from the object. The ambient sounds degrade the accuracy of position estimation of the object. Although there is a directional microphone having sound pressure sensitivity to a specific direction, it is difficult for even the directional microphone to selectively pick up sounds from a source at a specific position.

DETAILED DESCRIPTION

In general, according to one embodiment, a sound pickup device includes a processor with hardware. The processor calculates a first relational expression between acoustic filter factors of acoustic filters applied to microphone acquisition signals acquired by two or more microphones, based on a multiplication factor at a sensitization control point with high sound pressure sensitivity by the two or more microphones and a transfer function between each of the two or more microphones and the sensitization control point. The processor calculates a second relational expression between the acoustic filter factors, based on information of a frequency of a sound source and an interval between the two or more microphones. The processor calculates each of the acoustic filter factors, based on the first relational expression and the second relational expression.

Embodiments will be described below with reference to the drawings.

First Embodiment

Figure 1:
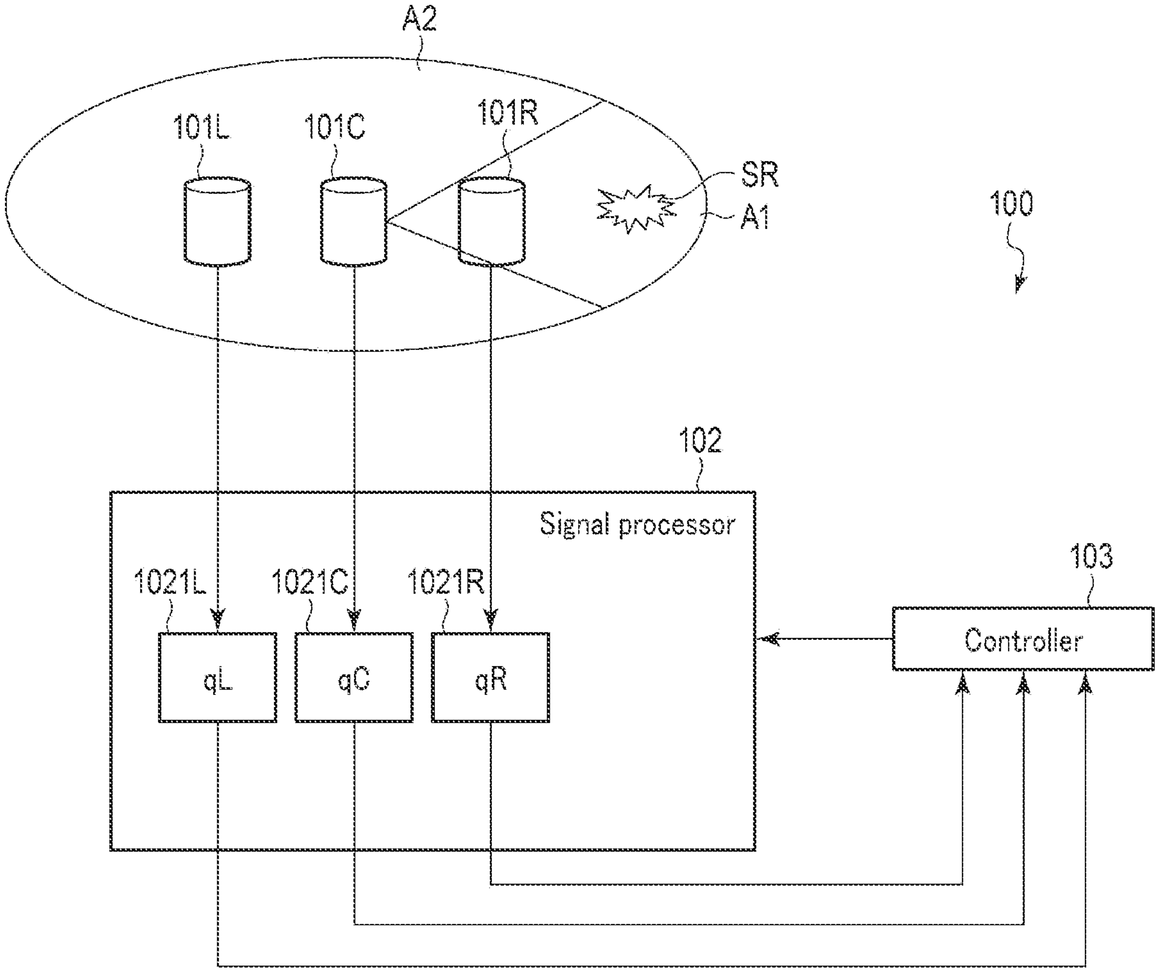
FIG. 1 is a diagram showing an example of a configuration of a sound pickup device according to a first embodiment.

A first embodiment will be described. FIG. 1 is a diagram showing an example of a configuration of a sound pickup device according to the first embodiment. The sound pickup device 100 includes microphones 101L, 101C and 101R, a signal processor 102 and a controller 103. In the first embodiment, a filter control law obtained in acoustic power minimization control and sound amplification control using a plurality of speakers is applied to a microphone sound pickup system, using the reciprocal theorem between a sound transmission system from a speaker to a spatial field and a sound transmission system from a sound source to a microphone. Accordingly, sensitization control is performed to increase pseudo-sensitivity to sound from a specific sensitization area A1 around the microphones 101L, 101C and 101R, and desensitization control is performed to decrease pseudo-sensitivity to sound from a desensitization area A2 other than the sensitization area A1. If a sound source SR is located in the sensitization area A1, only the sound from the sound source SR is picked up with high sensitivity. This allows an accurate position of the source SR to be estimated.

The sound amplification control increases sound pressure in a specific direction by controlling the amplitude of sound emitted from a plurality of speakers. The acoustic power minimization control minimizes acoustic power by controlling the amplitude and phase of sound emitted from a plurality of speakers when the speakers are regarded as one speaker. The sound amplification control and acoustic power minimization control are combined to create a gradient of sound pressure levels in a relatively narrow space around the speaker. This gradient ensures that sound is heard only in a certain area. That is, synthesized sounds from the speakers will have high directivity. Based on the reciprocal theorem, a combination of sensitization control and desensitization control is used to pick up sound with the sound pressure sensitivity distribution similar to that used to pick up sound from a sound field where a gradient of sound pressure levels is formed in a relatively narrow space around the microphones. That is, the synthesized sound of sounds picked up by the microphones is equivalent to that having high directivity.

The microphones 101L, 101C and 101R are devices that pick up ambient sound and convert it into an audio signal as an electrical signal. The microphones 101L, 101C and 101R are arranged side by side, for example, as shown in FIG. 1. The microphones 101L, 101C and 101R may be held integrally in a single housing. The microphones 101L, 101C and 101R may also be held in the same housing as the signal processor 102 and the controller 103. If the direction shown in FIG. 1 is the fronts of the microphones 101L, 101C and 101R, the microphone 101L acts as a left microphone, the microphone 101C acts as a center microphone, and the microphone 101R acts as a right speaker. The microphones 101L, 101C and 101R are preferably placed close to each other to some extent. The microphones may include a small one whose diameter is 3 mm. In this case, the microphones 101L, 101C and 101R could be spaced as short as 2.5 cm apart.

The signal processor 102 processes signal a microphone acquisition signal acquired from each of the microphones 101L, 101C and 101R. The signal processor 102 includes acoustic filters 1021L, 1021C and 1021R. An amplifier may be provided in a stage precedent to each of the microphones 101L, 101C and 101R.

The acoustic filter 1021L filters a microphone acquisition signal received from the microphone 101L in accordance with an acoustic filter factor qL designated by the controller 103. Then, the acoustic filter 1021L outputs the filtered microphone acquisition signal to the controller 103. The acoustic filter 1021C filters a microphone acquisition signal received from the microphone 101C in accordance with an acoustic filter factor qC designated by the controller 103. Then, the acoustic filter 1021C outputs the filtered microphone acquisition signal to the controller 103. The acoustic filter 1021R filters a microphone acquisition signal received from the microphone 101R in accordance with an acoustic filter factor qR designated by the controller 103. Then, the acoustic filter 1021R outputs the filtered microphone acquisition signal to the controller 103. Only the sounds in a specific band of the microphone acquisition signal are caused to pass through the acoustic filters. The acoustic filter factors qL, qC and qR can be determined based on a sound amplification control law and an acoustic power minimization control law, which will be described later.

The controller 103 determines the acoustic filter factors qL, qC and qR to be applied to the acoustic filters 1021L, 1021C and 1021R based on the sound frequency of the sound source SR and the interval between the microphones 101L, 101C and 101R. The controller 103 also estimates the position of the sound source SR from the microphone acquisition signals filtered in accordance with the acoustic filter factors qL, qC and qR.

Figure 2:
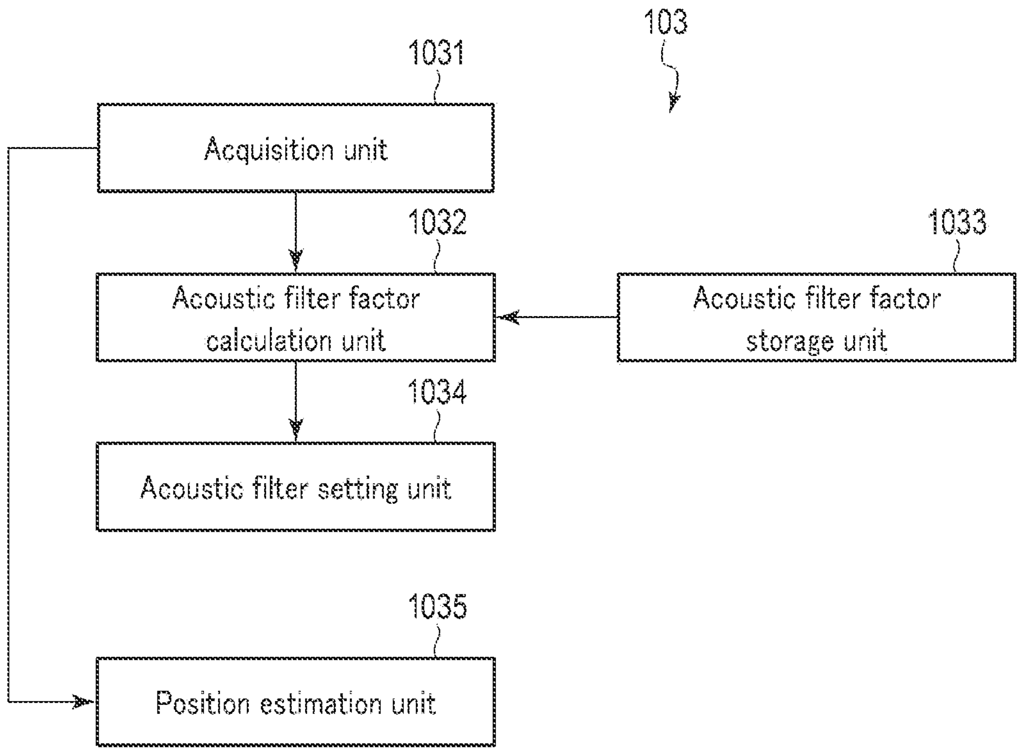
FIG. 2 is a block diagram showing elements included in a controller.

Next is a description of the controller 103. FIG. 2 is a block diagram showing elements included in the controller 103. The controller 103 includes an acquisition unit 1031, an acoustic filter factor calculation unit 1032, an acoustic filter factor storage unit 1033, an acoustic filter setting unit 1034 and a position estimation unit 1035.

The acquisition unit 1031 acquires various information items necessary to calculate the acoustic filter factors. Then, the acquisition unit 1031 inputs the acquired information items to the acoustic filter factor calculation unit 1032. The information items acquired by the acquisition unit 1031 include, for example, information of frequency, microphone interval and transfer function. The acquisition unit 1031 also acquires microphone acquisition signals filtered in accordance with the acoustic filter factors qL, qC and qR from the signal processor 102. Then, the acquisition unit 1031 inputs the acquired microphone acquisition signals to the position estimation unit 1035.

The frequency is the frequency of sound of the sound source SR to be detected. The acquisition unit 1031 acquires information of the frequency of the sound source SR based on input from the user, for example. If the sound velocity is known, the frequency can be converted into a wavenumber. Since the wavenumber is used to calculate the acoustic filter factors as will be described later, the acquisition unit 1031 may acquire information on the wavenumber. If the sound frequency of the sound source SR to be assumed is a fixed value, the acquisition unit 1031 may input information of the fixed frequency value stored in advance to the acoustic filter factor calculation unit 1032.

The microphone interval is interval between the microphones. The acquisition unit 1031 acquires a microphone interval based on input from the user, for example. The respective microphone intervals may be equal or different. If the microphones are fixed, the microphone intervals can be processed as fixed values. In this case, the acquisition unit 1031 may input information of the fixed microphone intervals, which is stored in advance, to the acoustic filter factor calculation unit 1032.

The transfer function represents the characteristics of sound transfer between each of the microphones 101L, 101C and 101R and a sensitization control point and depends upon the positional relationship between the microphones 101L, 101C and 101R and the sensitization control point. The sensitization control point is a control target position of sensitization control. It is assumed that there is a sound source at the sensitization control point. The transfer function is represented by a matrix whose elements are spatial transfer characteristics CL of sound transmitted from the sensitization control point to the microphone 101L, spatial transfer characteristics CC of sound transmitted from the sensitization control point to the microphone 101C and spatial transfer characteristics CR of sound transmitted from the sensitization control point to the microphone 101R. The spatial transfer characteristics can be measured from microphone acquisition signals obtained by emitting sounds based on a random signal or sounds based on a time stretched pulse (TSP) signal from the sensitization control point in an anechoic room, an audiovisual room or the like with little sound reflection and then picking up the sounds by the microphones 101L, 101C and 101R. The acquisition unit 1031 acquires the transfer function thus measured. If the positions of the microphones 101L, 101C and 101R and the position of the sensitization control point are fixed, the transfer function can be processed as a fixed transfer function. In this case, the acquisition unit 1031 may input a fixed transfer function, which is stored in advance, in the acoustic filter factor calculation unit 1032.

The acoustic filter factor calculation unit 1032 receives various information items from the acquisition unit 1031 and also receives an acoustic filter factor for at least one microphone from the acoustic filter factor storage unit 1033 to calculate acoustic filter factors for the remaining microphones. Then, the acoustic filter factor calculation unit 1032 inputs the acoustic filter factors to the acoustic filter setting unit 1034. The calculation of the acoustic filter factors will be described in detail later.

The acoustic filter factor storage unit 1033 stores an acoustic filter factor for at least one of the microphones 101L, 101C and 101R. For example, the acoustic filter factor storage unit 1033 stores an acoustic filter factor for the microphone 101C. The acoustic filter factor storage unit 1033 can be provided if the number of microphones is three or more. If the number of microphones is m (m≥3), the acoustic filter factor storage unit 1033 stores at least (m−2) acoustic filter factors. In the first embodiment, two or more microphones have only to be provided. If there are two microphones, the acoustic filter factor storage unit 1033 may be excluded.

The acoustic filter setting unit 1034 sets the acoustic filter factor calculated by the acoustic filter factor calculation unit 1032 to each of the acoustic filters 1021L, 1021C and 1021R.

The position estimation unit 1035 estimates the position of the sound source SR from the filtered microphone acquisition signal acquired by the acquisition unit 1031. The estimation of the position of the sound source SR will be described in detail later.

Next is a description of the calculation of an acoustic filter factor in the acoustic filter factor calculation unit 1032. As described above, the relational expression for deriving an acoustic filter factor is determined from the sound amplification control law and the acoustic power minimization control law using a plurality of speakers. Below is a description of each of the sound amplification control and acoustic power control.

Figure 3:
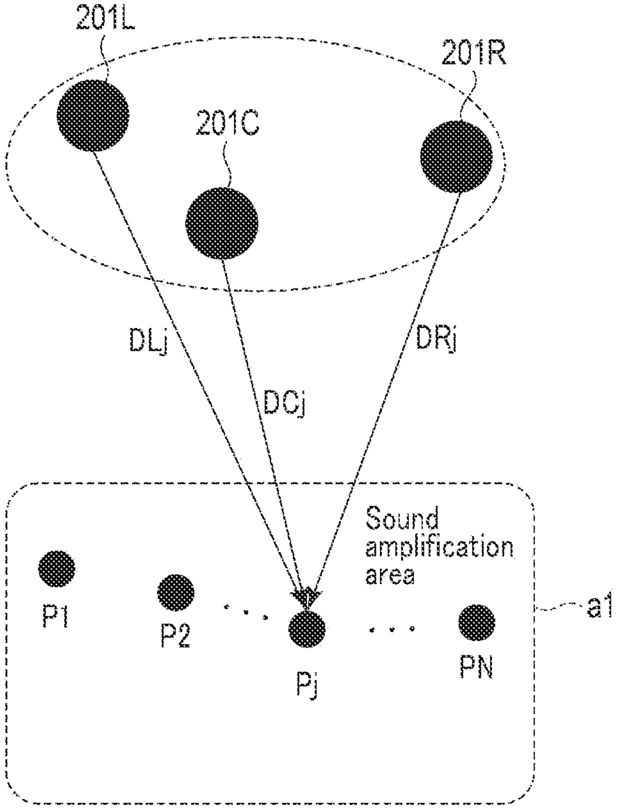
FIG. 3 is a conceptual diagram of sound amplification control.

First, the sound amplification control will be described. FIG. 3 is a conceptual diagram of the sound amplification control. In the sound amplification control of FIG. 3, three speakers 201L, 201C and 201R are used.

The sound amplification control is control to multiply the sound pressure energy in the sound amplification area a1 by n. If the sound pressure energy in the sound amplification area a1 before the sound amplification control is $Q_{OFF}$ and the sound pressure energy in the sound amplification area a1 after the sound amplification control is $Q_{ON}$, the sounds emitted from the speakers 201L, 201C and 201R are controlled to satisfy the following equation (1). The "before the sound amplification control" in this embodiment refers to a state in which sound is emitted only from the reference speaker 201C.

$$Q_{ON}=nQ_{OFF} \quad (1)$$

Assuming that there are N sound amplification control points in the sound amplification area a1, the sound pressure at each of the sound amplification control points before the sound amplification control is Pj (j=1, 2, . . . , N), the sound pressure at each of the sound amplification control points after the sound amplification control is P'j (j=1, 2, . . . , N), the transfer function between speaker 201L and each of the sound amplification control points is DLj (j=1, 2, . . . , N), the transfer function between the speaker 201C and each of the sound amplification control points is DCj (j=1, 2, . . . , N), the transfer function between the speaker 201R and each of the sound amplification control points is DRj (j=1, 2, . . . , N), the complex volume velocity of the speaker 201L is qL, the complex volume velocity of the speaker 201C is qC and the complex volume velocity of the speaker 201R is qR, the sound pressure energies $Q_{OFF}$ and $Q_{ON}$ in the sound amplification area a1 are each the sum of sound pressure energies at each of the sound amplification control points and are calculated by the following equations (2) and (3), respectively. In the equations (2) and (3), * is a symbol representing a complex conjugate. If j is 1, that is, if the number of sound amplification control points is 1, the sound pressure energy is equal to the sound pressure at the sound amplification control point.

$$Q_{OFF} = \sum_{j=1}^{N} Pj \cdot Pj^* \quad (2)$$

$$Pj = DCj \cdot qC$$

$$Q_{ON} = \sum_{j=1}^{N} P'j \cdot P'j^* \quad (3)$$

$$P'j = DLj \cdot qL + DCj \cdot qC + DRj + qR$$

The acoustic filter factors may be set equal to the complex volume velocities of the speakers 201L, 201C and 201R. If, therefore, qL, qC and qR are calculated when the relational expression for the sound amplification control given by equation (1) is satisfied, the acoustic filter factors necessary for the sound amplification control are calculated. As will be described later, one relational expression is derived for each of the sound amplification control and acoustic power minimization control. Thus, qL, qC and qR are calculated by at least one of qL, qC and qR which is predetermined. Assuming that for example, qC is predetermined as a fixed value of 1, the acoustic filter factors qR and qL have only to be determined. Sorting equations (1), (2) and (3) with respect to qL, equation (4) is obtained. Equation (4) is a first relational expression for the acoustic filter qL derived from the sound amplification control. The equations (1), (2) and (3) may be sorted with respect to qR.

$$qL = -\frac{(1-n)\cdot \sum DCj \cdot DCj^* \cdot qC + \sum DRj \cdot DRj^* \cdot qR}{\sum DLj \cdot DLj^*} \quad (4)$$

Figure 4:
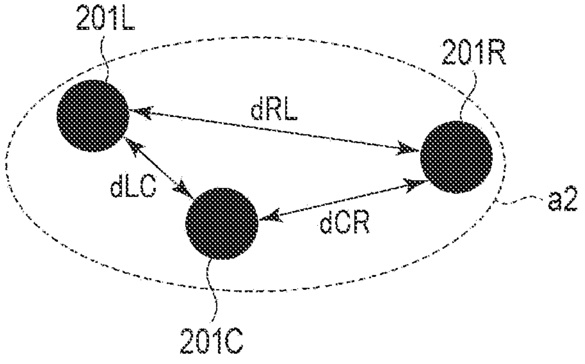
FIG. 4 is a conceptual diagram of acoustic power minimization control.

Next is a description of the acoustic power minimization control. FIG. 4 is a conceptual diagram of the acoustic power minimization control. Like FIG. 3, FIG. 4 shows the acoustic power minimization control using three speakers, 201L, 201C and 201R.

The acoustic power minimization control is control to minimize acoustic power in the sound reduction area a2 around the speakers. Acoustic power W for one sound source is calculated by the following equation (5). In equation (5), Re is a symbol for taking the real part in the parentheses, ω is an angular frequency, ρ is the density of a medium, typically air, k is a wavenumber, qL, qC and qR are complex volume velocities of the corresponding sound sources, and dLC, dRL and dCR are speaker intervals between the corresponding speakers. As in equations (2) and (3), in equation (4), * is a symbol representing a complex conjugate. The unit of the acoustic power is, for example, W and the unit of the complex volume velocity is, for example, $m^3/s$. As can be seen from the unit, the acoustic power refers to the energy of sound per unit time. The acoustic power is an absolute value determined by the sound source and does not depend upon the position from the sound source.

$$W = \frac{1}{2}\mathrm{Re}[p^* q] = \frac{\omega\rho k}{8\pi}\frac{\sin kd}{kd}q^* q \tag{5}$$

$$p = zq = \frac{j\omega\rho}{4\pi r}e^{jkr*}q$$

The above equation (5) represents the acoustic power for one sound source. The acoustic power W for three sound sources as shown in, for example, FIG. 4 is calculated by the following equation (6).

$$\begin{aligned} W = \alpha(&qL\cdot qL^* + qL\cdot qC^*\mathrm{sinc}kdLC + qL\cdot qR^*\mathrm{sinc}kdRL + \\ &qC\cdot qC^* + qC\cdot qL^*\mathrm{sinc}kdLC + qC\cdot qR^*\mathrm{sinc}kdCR + \\ &qR\cdot qR^* + qR\cdot qL^*\mathrm{sinc}kdRL + qR\cdot qC^*\mathrm{sinc}kdCR) \end{aligned} \tag{6}$$

$$\alpha = \frac{\omega\rho k}{8\pi},\ \mathrm{sin}kd = \frac{\sin kd}{kd}$$

If qL, qC and qR for minimizing the acoustic power W in equation (6) are calculated, the acoustic filter factors necessary for acoustic power minimization control are calculated. For this purpose, partial differential calculation is performed as given by equation (7).

$$\frac{\partial W}{\partial qL^r} = 0,\ \frac{\partial W}{\partial qL^i} = 0 \tag{7}$$

$$qL = qL^r + jqL^i,\ qL^* = qL^r - jqL^i$$

Sorting the results of equation (7) with respect to qL, equation (8) is obtained. Equation (8) is a second relational expression for the acoustic filter qL derived from the acoustic power minimization control.

$$qL = -\left(\frac{\sin kdLC}{kdLC}qC + \frac{\sin kdRL}{kdRL}qR\right) \tag{8}$$

Since qC is predetermined, if "qC=1" is substituted into equations (4) and (8) to be sorted with respect to qR, qL, qC and qR in which both the sound amplification control and acoustic power minimization control are compatible, can be obtained as given by the following equation (9).

$$qC = 1 \tag{9}$$

$$qR = \frac{DLj\mathrm{sinc}kdLC - (1-n)DCj}{DLj\mathrm{sinc}kdRL - DRj}qC$$

$$qL = -\left(\frac{\sin kdLC}{kdLC}qC + \frac{\sin kdRL}{kdRL}qR\right)$$

The acoustic filter factors qL, qC, and qR in equation (9) are applied to audio signals input to the speakers and thus the surroundings of the speakers are quieted while increasing the sound pressure of the sound amplification control points. The acoustic filter factors qL, qC and qR in equation (9) are also used as those for the microphone acquisition signals by replacing n in equation (9) with the multiplication factor of sound pressure sensitivity to sound from a sound source to be detected, by replacing the transfer functions DLj, DCj and DRj with those between their respective microphones 101L, 101C and 101R and sensitization control points, and replacing d with a microphone interval. Hereinafter, the transfer functions DLj, DCj and DRj in equation (9) will be described as transfer functions between their respective microphones 101L, 101C and 101R and sensitization control points, and d in equation (9) will be described as a microphone interval.

As shown in equation (9), qL and qR are functions of a kd value, which is the product of a wavenumber k and an interval between microphones, and the transfer functions DLj, DCj and DRj between each of the microphones and the sensitization control point in each of the sensitization areas. The kd value is a dimensionless quantity corresponding to the phase and can be determined by the frequency of sounds collected by the microphones and the microphone interval if the sound velocity c is determined. In addition, the transfer functions can be measured from microphone acquisition signals acquired by emitting sounds based on random signals or sounds based on time stretched pulse (TSP) signals from the sensitization control points in an anechoic room, an audiovisual room or the like with little sound reflection and then picking up the sounds by the microphones 101L, 101C and 101R.

Figure 5:
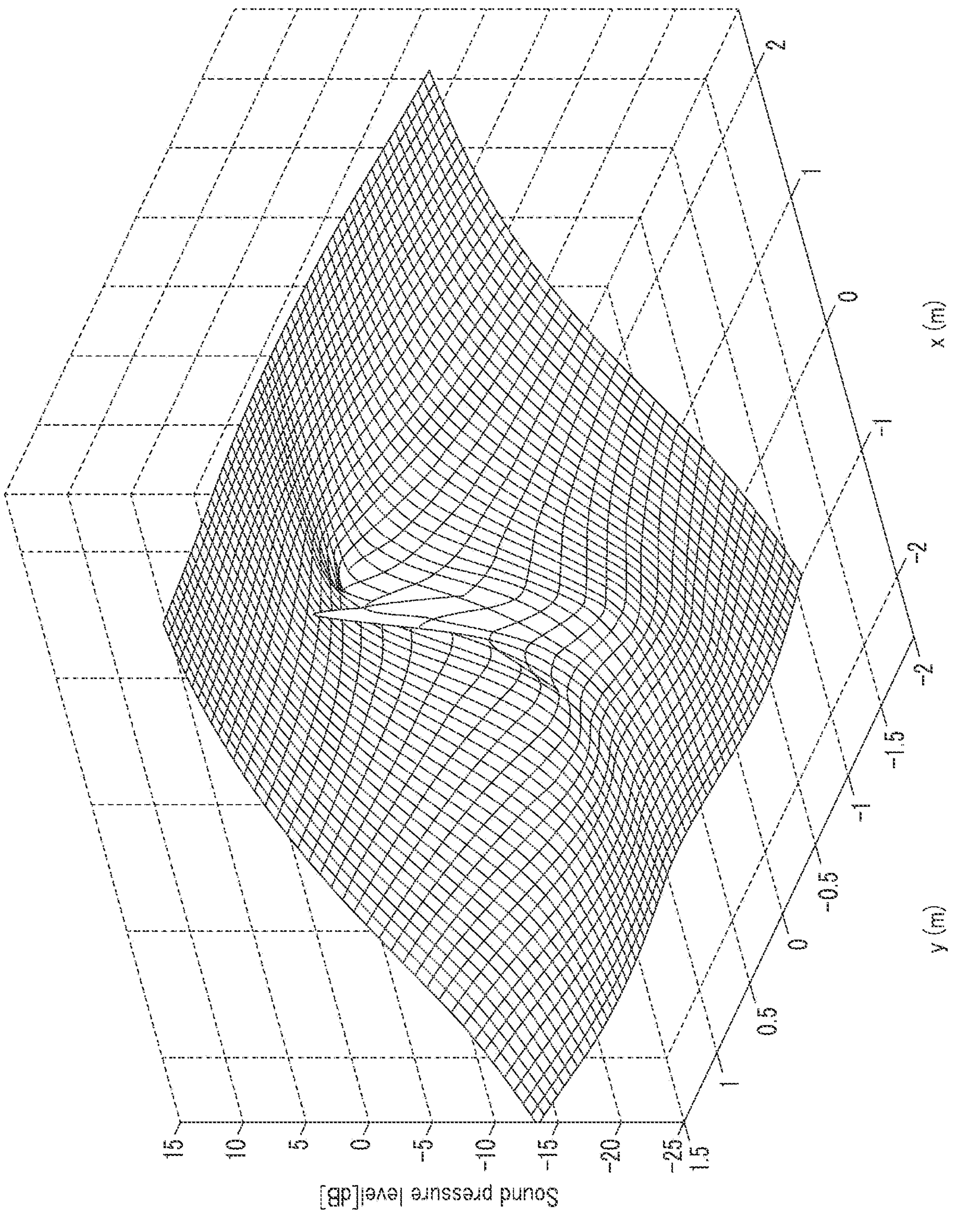
FIG. 5 is a diagram showing the distribution of sound pressure sensitivity of a microphone using an acoustic filter that is set as a result of equation (9).

FIG. 5 shows showing the distribution of sound pressure sensitivity of a microphone using an acoustic filter that is set as a result of equation (9). In the example of FIG. 5, the frequency of a sound source is 500 Hz and the interval between microphones is 10 cm. In FIG. 5, the x and y axes are distances from the position of, for example, the microphone 101C when the position is the origin. The vertical axis in FIG. 5 indicates the sound pressure level. As shown in FIG. 5, an area where the amount of decrease in the sound pressure level is small, such as an area of "+0.75≤x≤+2" and "−1.25≤y≤1.5" (the units of which are meters) is a sensitization area. That is, the sound pickup device 100 of the first embodiment can create a gradient of sound pressure sensitivity within a relatively narrow space of, e.g., 2 m×2 m around the microphones 101L, 101C and 101R. Since a gradient of sound pressure sensitivity is created in a narrow space, the sound pickup device 100 of the first embodiment has a high directivity even for sounds in a low frequency range. This is because the acoustic power minimization control has an advantage of decreasing the sound pressure level for the sounds in a low frequency range, and the advantage is applied to the desensitization control by the reciprocal theorem.

Since the acoustic power W is a function of the kd value as is seen from equation (6), the amount of decrease in acoustic power is determined by the kd value in the acoustic power minimization control. Even though the frequency or the speaker interval changes, the same amount of reduction in acoustic power can be obtained if the kd value is constant. If this is replaced with the relationship between the microphones and the sensitization control points, the replacement means that sound is picked up in the same distribution of sound pressure sensitivity if the kd value is constant. When the frequency of the sound source is, for example, 1000 Hz, if the microphone interval is 5 cm, sound is picked up with the same distribution of sound pressure sensitivity as in FIG. 5. Conversely, a change in the kd value means that sound is not picked up in the same distribution of sound pressure sensitivity. When the frequency of the sound source is, for example, 1000 Hz, if the microphone interval is 2.5 cm, sound is picked up in the distribution of sound pressure sensitivity which differs from that in FIG. 5.

Figure 6:
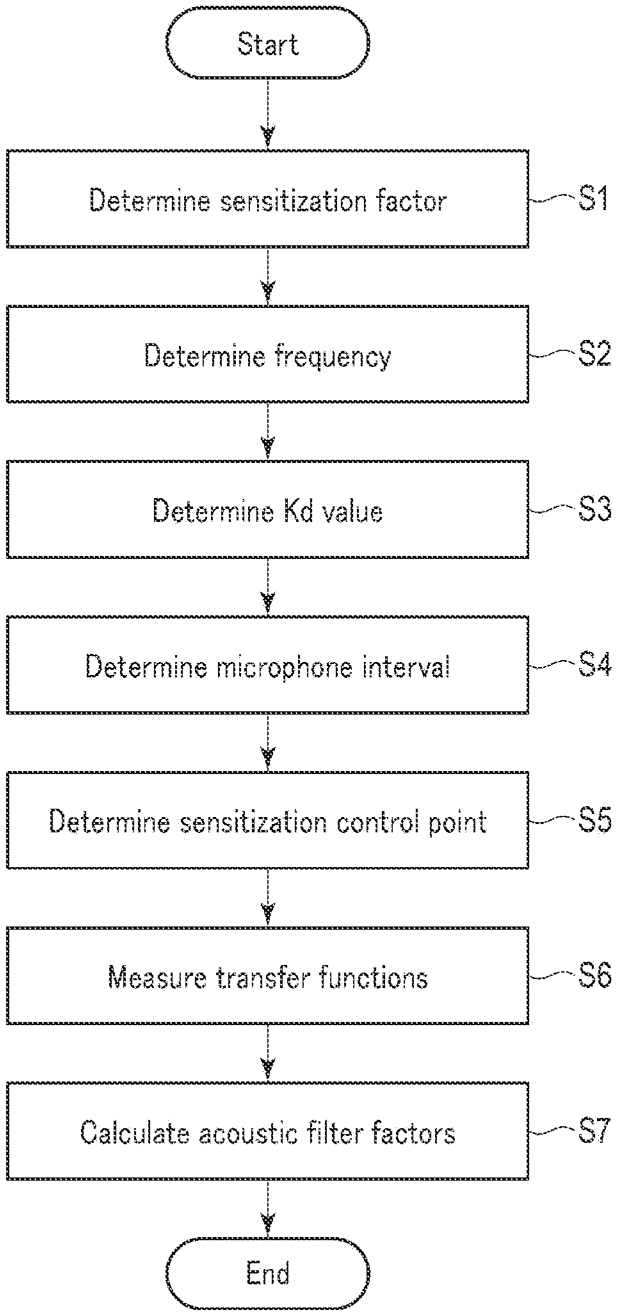
FIG. 6 is a flowchart showing a process of spatial sound field design including the determination of microphone interval and frequency.

FIG. 6 is a flowchart showing a process of spatial sound field design including the determination of microphone interval and frequency. The process shown in FIG. 6 is performed when an acoustic filter factor is set in the acoustic filter setting unit 1034.

In step S1, the controller 130 determines a sensitization factor n. The sensitization factor n corresponds to n shown in equation (1) and is determined appropriately by the user, for example. The sensitization factor n may be fixed or may be determined upon receipt of it from the user or the operator who is responsible for setting up the sound pickup device 100.

In step S2, the controller 130 determines the frequency of a sound source. The frequency of a sound source is determined appropriately by the user, for example.

In step S3, the controller 130 determines a kd value. The kd value is determined appropriately in accordance with the amount of decrease in sound pressure level which is required by the desensitization control and which corresponds to the amount of decrease in the acoustic power of the acoustic power minimization control. The kd value may be fixed, for example, and may be determined upon receipt of it from the user or the operator who is responsible for setting up the sound pickup device 100. If the microphone interval and the frequency are fixed, the process of step S3 need not be performed.

In step S4, the controller 130 determines a microphone interval based on the frequency and the kd value.

In step S5, the controller 130 determines a sensitization control point. The sensitization control point can be determined within a range of 2 m×2 m with reference to the microphone 101C, for example. The sensitization control point is determined based on the position of a sound source to be estimated. The sensitization control point may be determined upon receipt of it from the user or the operator who is responsible for setting up the sound pickup device 100. In this case, the controller 130 may perform display or the like for inputting the sensitization control point. This display is, for example, a 2 m×2 m map centered on the microphone 101C. The user or operator may optionally designate, for example, one point on the map as the sensitization control point.

In step S6, the controller 130 measures transfer functions. As described above, the transfer functions can be measured from microphone acquisition signals acquired by emitting sounds based on random signals or sounds based on time stretched pulse (TSP) signals from the sensitization control points in an anechoic room, an audiovisual room or the like with little sound reflection and then picking up the sounds by the microphones 101L, 101C and 101R. The transfer functions may be measured with respect to a plurality of positions to be assumed as the sensitization control points.

In step S7, the controller 130 calculates filter factors qL, qC and qR from the sensitization factor, microphone interval, frequency and transfer function based on equation (9). The controller 130 then sets the filter factors qL, qC and qR to the acoustic filters 1021L, 1021C and 1021R, respectively. Then, the controller 130 ends the process of FIG. 6.

FIGS. 7A, 7B, 7C and 7D are graphs each showing a result of experiment for measuring noise levels of sounds which are emitted from sound sources placed at different positions and picked up by a microphone to which the acoustic filter factors are set as described in the foregoing first embodiment. In FIGS. 7A, 7B, 7C and 7D, the horizontal axis represents the center frequency of a ⅓ octave band and the vertical axis represents the level of the ⅓ octave band.

Figure 8:
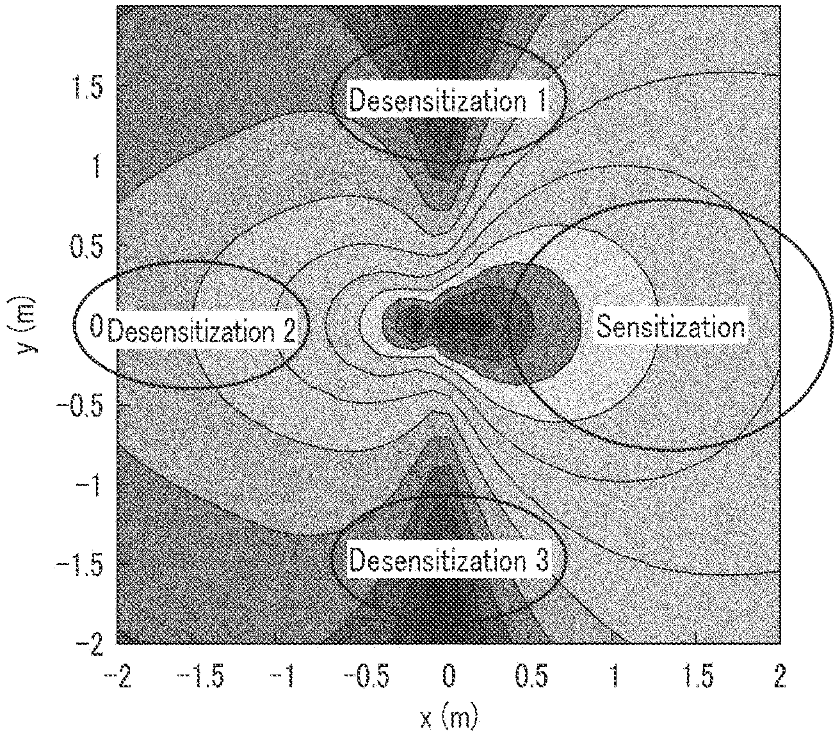
FIG. 8 is a diagram of the distribution of sound pressure sensitivity of the microphone in the experiments.

In the experiment, the acoustic filter factors are set so that the distribution of sound pressure sensitivity shown in FIG. 8 can be obtained. In this distribution, the level of sound pressure sensitivity is represented by the concentration. In the experiment, as shown in FIG. 8, if the right direction of the microphones 101L, 101C and 101R is defined as the 0-degree direction, a sensitization area is set in the 0-degree direction, and desensitization areas 1, 2 and 3 are set in the 90-degree direction, 180-degree direction and 270-degree direction, respectively.

Figure 9A:
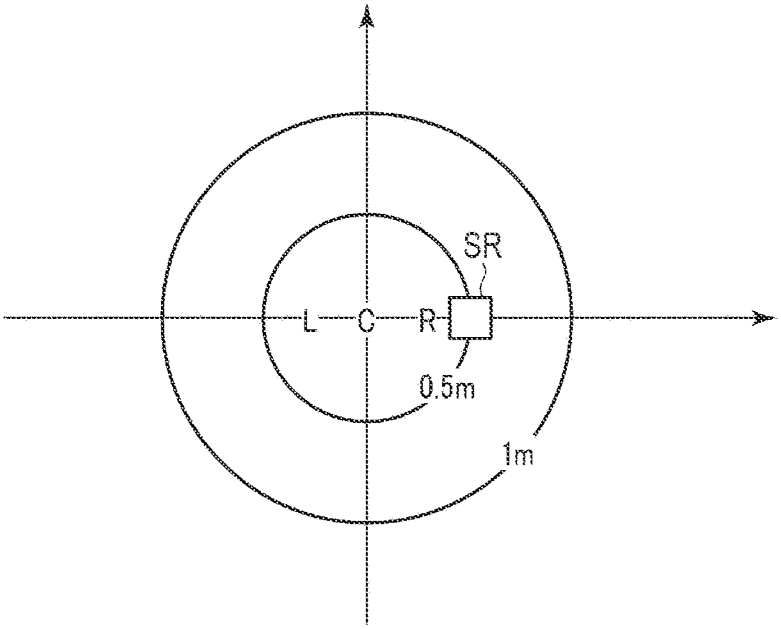
FIG. 9A is a diagram showing the positional relationship between the microphones and the sound source in the experiment in FIG. 7A.
Figure 9B:
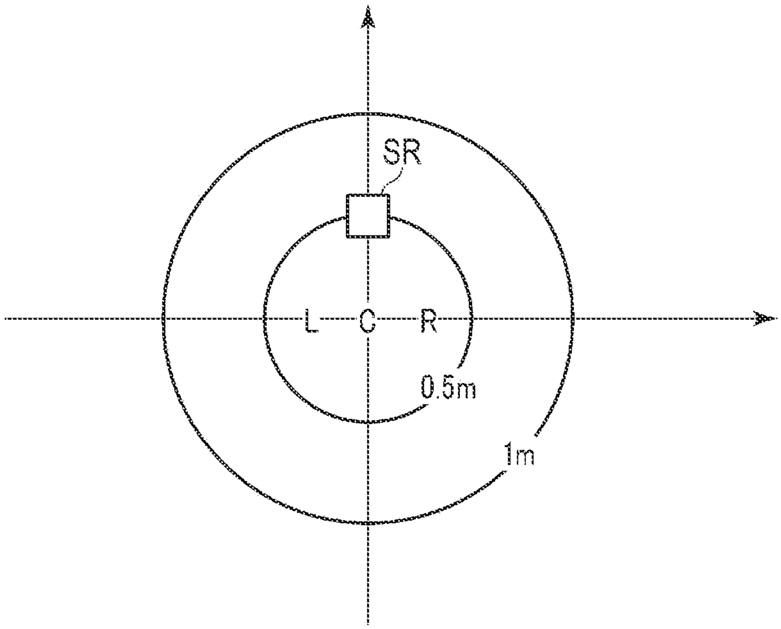
FIG. 9B is a diagram showing the positional relationship between the microphones and the sound source in the experiment in FIG. 7B.
Figure 9C:
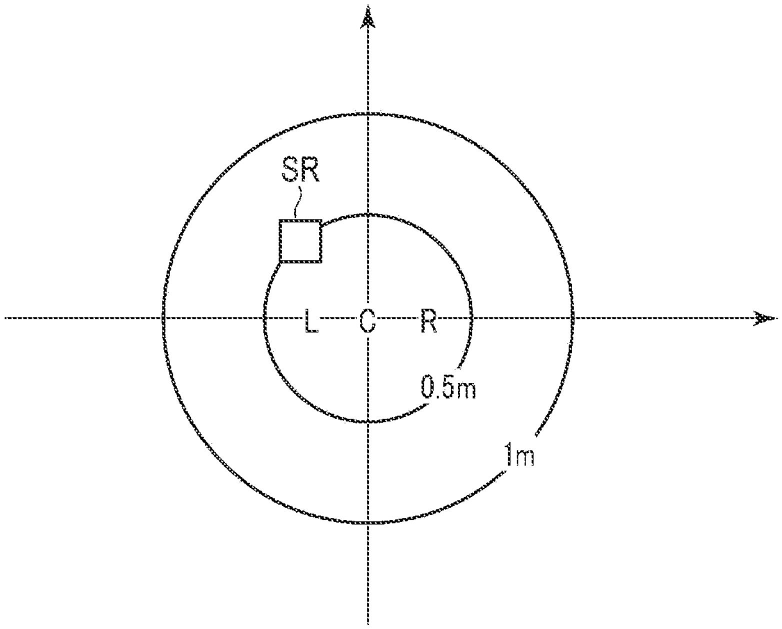
FIG. 9C is a diagram showing the positional relationship between the microphones and the sound source in the experiment in FIG. 7C.
Figure 9D:
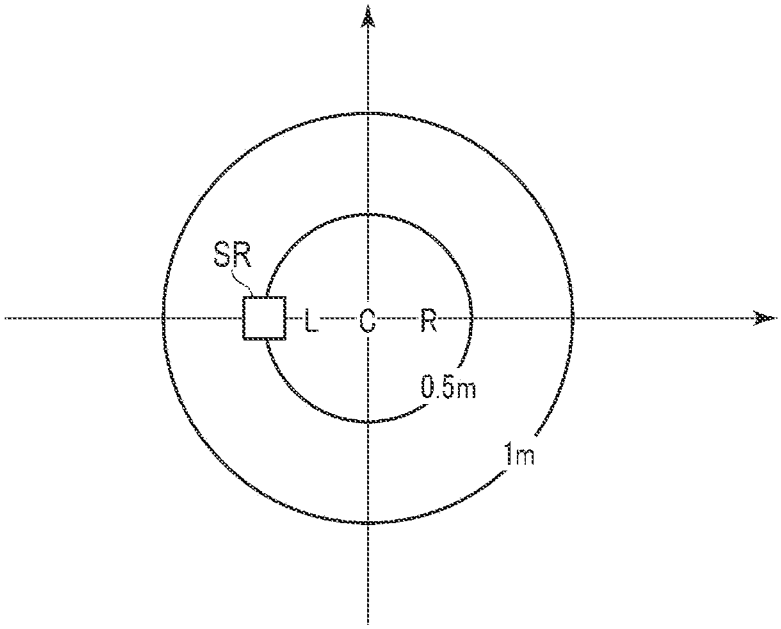
FIG. 9D is a diagram showing the positional relationship between the microphones and the sound source in the experiment in FIG. 7D.

FIGS. 9A, 9B, 9C and 9D show the positional relationship between the microphones and the sound source in the experiments. FIG. 9A corresponds to FIG. 7A. FIG. 9B corresponds to FIG. 7B. FIG. 9C corresponds to FIG. 7C. FIG. 9D corresponds to FIG. 7D. The microphones 101L, 101C, and 101R are placed at their respective positions of L, C and R in FIGS. 9A, 9B, 9C and 9D. In addition, a sound source is placed at the position of SR in FIGS. 9A, 9B, 9C and 9D. The sound source is a speaker that emits random noise sounds. The microphone interval between the microphones 101L, 101C, and 101R is 10 cm. Due to the limitation of the foregoing kd value, the frequency range of the sound source with great advantages of sensitization and desensitization control at the microphone interval of 10 cm is calculated to be 400 Hz to 1250 Hz at the center frequency of the ⅓ octave band.

Figure 7A:
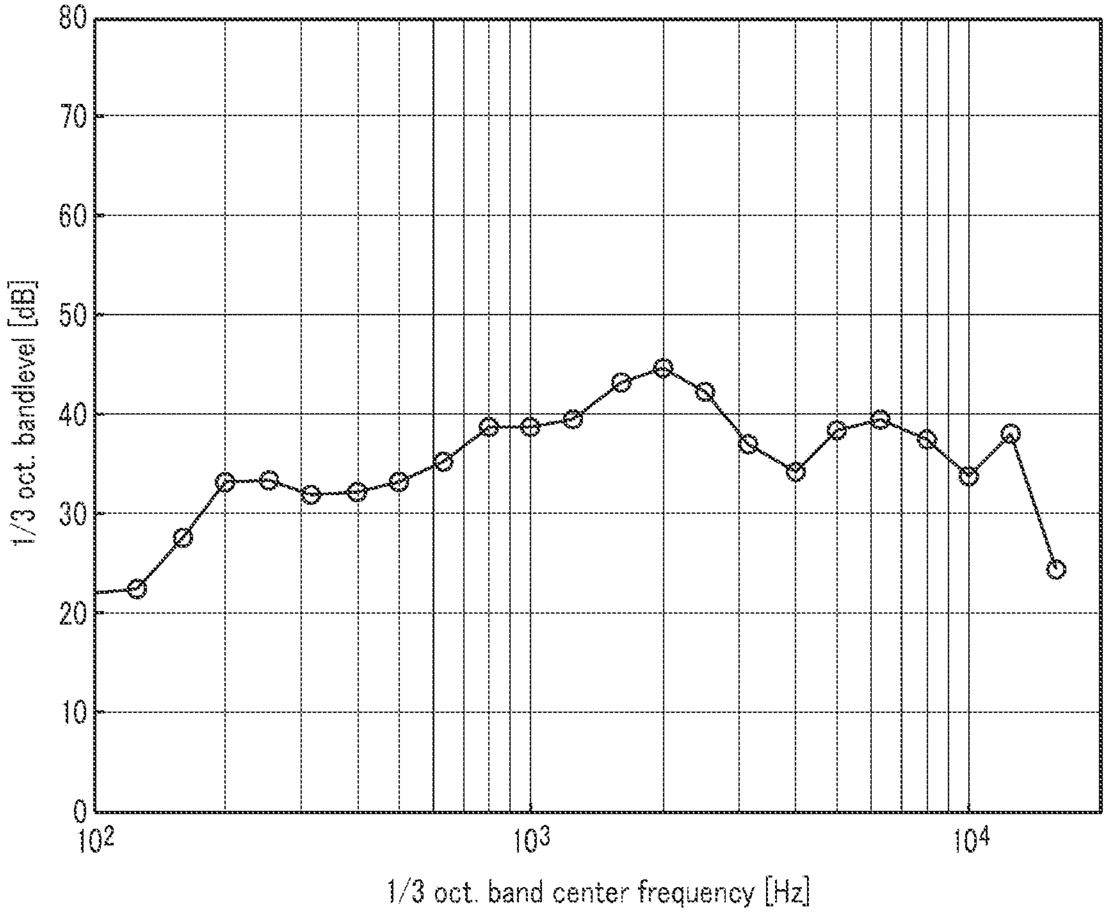
FIG. 7A is a graph showing a result of experiment for measuring noise levels of sounds which are emitted from sound sources placed at different positions and picked up by a microphone to which an acoustic filter factor is set.

FIG. 7A corresponds to the result of the experiment in which a sound source is placed in the sensitization area. When a sound source is placed in the sensitization area as shown in FIG. 7A, the sound pressure level at 400 Hz to 1250 Hz is about 35 dB to 45 dB.

Figure 7B:
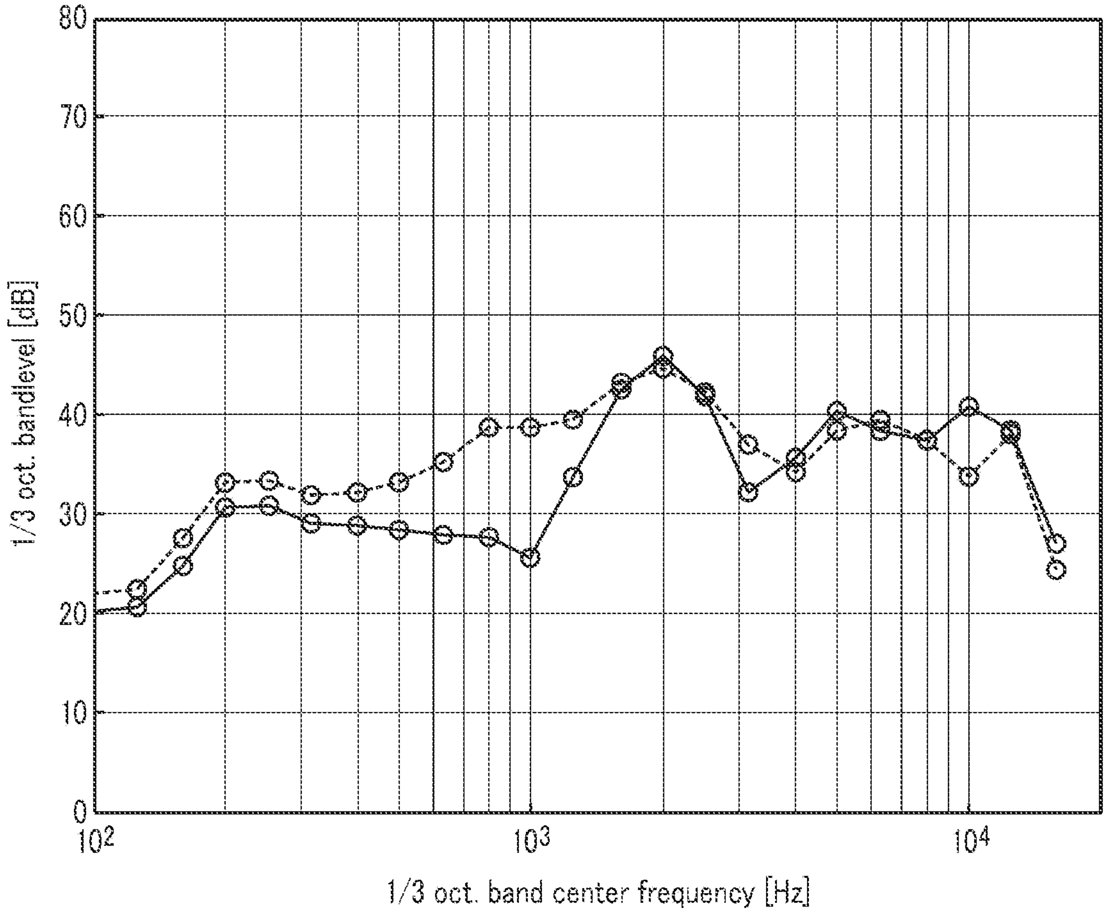
FIG. 7B is a graph showing a result of experiment for measuring noise levels of sounds which are emitted from sound sources placed at different positions and picked up by a microphone to which an acoustic filter factor is set.
Figure 7C:
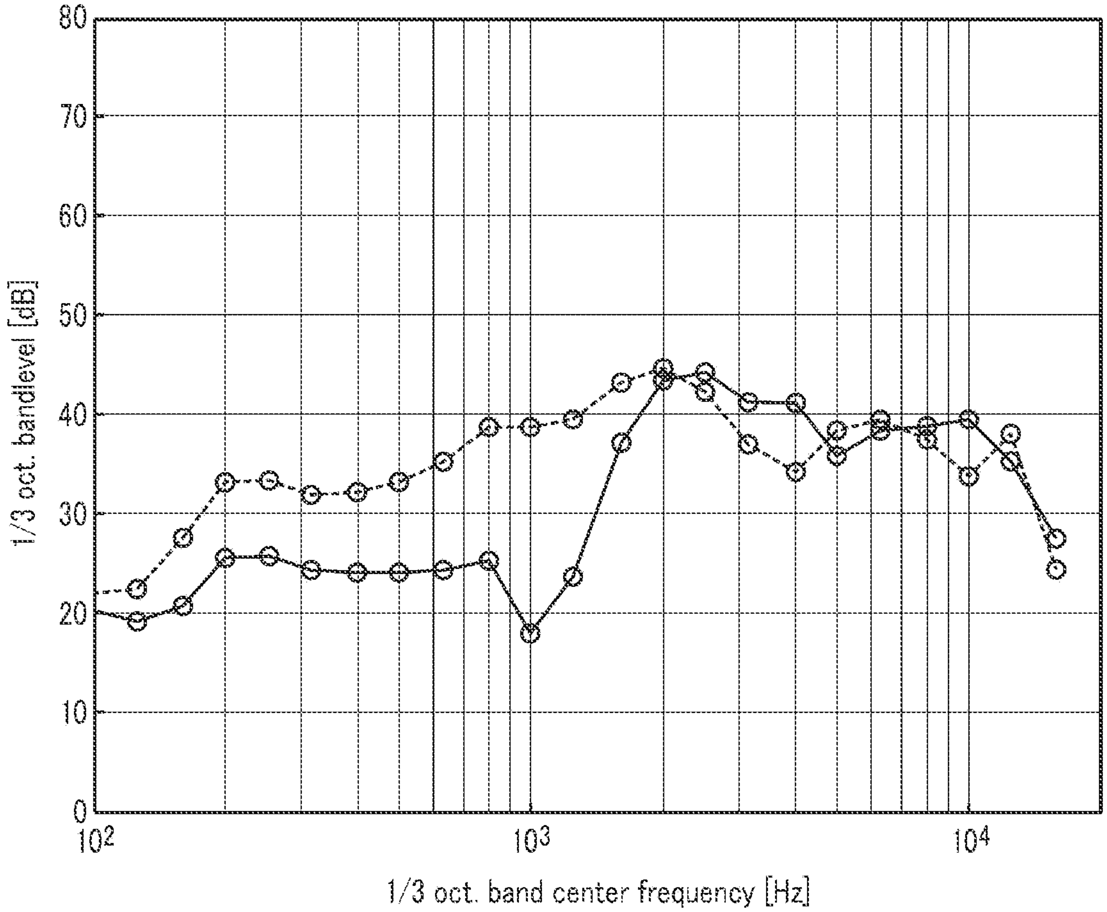
FIG. 7C is a graph showing a result of experiment for measuring noise levels of sounds which are emitted from sound sources placed at different positions and picked up by a microphone to which an acoustic filter factor is set.
Figure 7D:
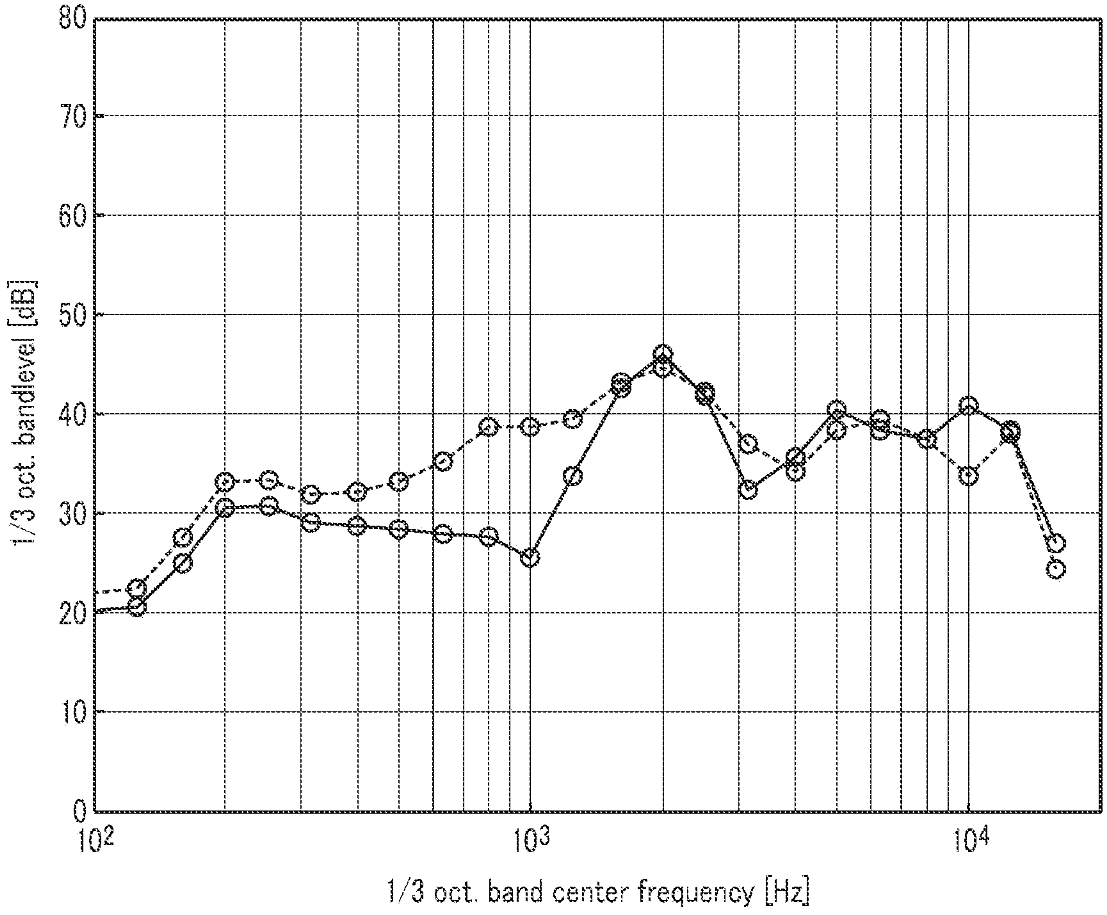
FIG. 7D is a graph showing a result of experiment for measuring noise levels of sounds which are emitted from sound sources placed at different positions and picked up by a microphone to which an acoustic filter factor is set.

FIGS. 7B, 7C and 7D correspond to the results of experiments in which no sound source is placed in the sensitization area. In each of FIGS. 7B, 7C and 7D, the experimental result of FIG. 7A is shown by the broken line for comparison. When no sound source is placed in the sensitization area as shown in FIGS. 7B, 7C and 7D, the sound pressure level at 400 Hz to 1250 Hz is about 20 dB to 30 dB. That is, the sound pressure level of sounds picked up by the microphones when no sound source is placed in the sensitization area is lower than the sound pressure level of sounds picked up by the microphones when a sound source is placed in the sensitization area. The combination of sensitization control and desensitization control makes it clear that there is a sharp difference in sound pressure levels despite the short distance.

The amount of decrease in the sound pressure level in FIG. 7D when the sound source is placed in the direction of 180 degrees is smaller than the amount of decrease in the sound pressure level in FIGS. 7B and 7C. This is based on the principle of the acoustic power minimization control. In the acoustic power minimization control, if the sound pressure level decreases at a certain point, it increases at another point. The increase in the sound pressure level occurs in the sound reduction area that is symmetrical to the sound amplification area with reference to the position of the speaker 201C. In the sensitization control and desensitization control, an acoustic filter is applied to the microphone acquisition signals in such a way that sounds are picked up from the sound field formed by the sound amplification control and the acoustic power minimization control. Even in the sensitization control and desensitization control, therefore, the amount of decrease in the sound pressure level in the desensitization area that is symmetrical to the sensitization area with reference to the microphone 101C is smaller than the amount of decrease in the sound pressure level in the other desensitization areas.

In contrast, the amount of decrease in the sound pressure level in the desensitization area that is symmetrical to the sensitization area can be increased by placing a phaser at a stage precedent to the acoustic filters 1021L, 1021C and 1021R, for example, to shift the phase of the microphone acquisition signal. In this case, the phase of a microphone acquisition signal input to the acoustic filter 1021L is, for example, 240 degrees, the phase of a microphone acquisition signal input to the acoustic filter 1021C is, for example, 0 degrees, and the phase of a microphone acquisition signal input to the acoustic filter 1021R is, for example, 120 degrees. In the acoustic power minimization control, therefore, the sound pressure level in the sound reduction area that is symmetrical to the sound amplification area slightly increases, but a sufficient amount of decrease in the sound pressure level is ensured even in the sound reduction area that is symmetrical to the sound amplification area. By replacing this with a microphone, a sufficient amount of decrease in the sound pressure level is ensured in the desensitization area that is symmetrical to the sensitization area with reference to the microphone 101C.

Instead of making a phase correction to a microphone acquisition signal, the gain of a microphone acquisition signal acquired by a microphone that is farthest from a sensitization control point is further decreased, thus obtaining the advantage equivalent to the phase correction.

Next is a description of estimating the position of a sound source by the position estimation unit 1035. The position estimation unit 1035 estimates the position of a sound source based on the microphone acquisition signals which are acquired by the microphones 101R, 101C and 101L and to which the filters of the acoustic filter factors given by equation (9) are applied. In the first embodiment, when the sound source is located at the sensitization control point, the sound pressure level of the microphone acquired signals to which the filters are applied increases. On the other hand, when no sound source is located at the sensitization control point, the sound pressure level of the microphone acquisition signals to which the filters are applied decreases. Thus, the position estimation unit 1035 estimates the position of a sensitization control point with the highest sound pressure level as the position of the sound source.

As described above, according to the first embodiment, if a filter control law on the sound amplification control using a speaker and the acoustic power minimization control is applied to a microphone, pseudo-sensitivity to sound can be increased in a specific area and pseudo-sensitivity to sound can be decreased outside the specific area. Thus, a gradient of sound pressure sensitivity is formed in a narrow space, and the sounds of a sound source at a specific position can selectively be picked up. The sound pickup device can thus estimate not only the direction of a sound source but also the location of the sound source with high accuracy.

Also, in the first embodiment, a gradient of sound pressure sensitivity can be formed within a narrow area. Therefore, directivity to low-frequency sounds can also be ensured. In addition, only the sounds from a sound source can be picked up even in a reverberant space. In the inventors' experiments, if the sound pressure sensitivity of a directional microphone and that of a microphone using the method of the first embodiment were compared, it was confirmed that the method of the first embodiment ensured more directivity to sounds, especially in the low-frequency range.

Second Embodiment

Next is a description of a second embodiment. As has been described in the first embodiment, it is determined by the kd value whether a sufficient gradient of sound pressure sensitivity can be formed by the filter control law on the sound amplification control and acoustic power minimization control. That is, an applicable frequency band is defined in a certain range in a single microphone interval. The second embodiment is intended to widen a frequency band capable of forming a gradient of sound pressure sensitivity by simultaneously picking up sounds with a plurality of microphones with different microphone intervals.

Figure 10:
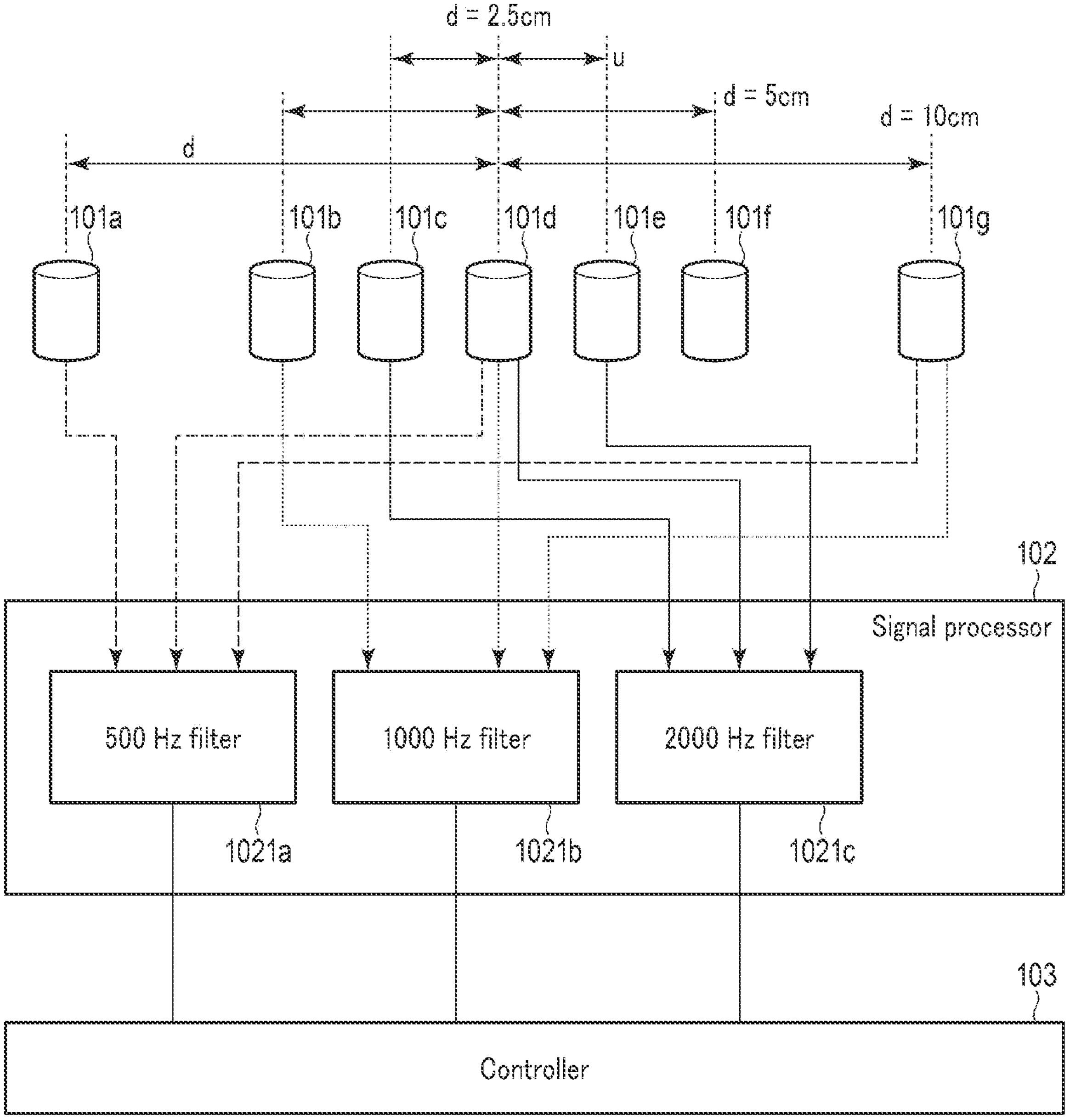
FIG. 10 is a diagram showing an example of a configuration of a sound pickup device according to a second embodiment.

FIG. 10 is a diagram showing an example of a configuration of a sound pickup device according to the second embodiment. The sound pickup device of the second embodiment includes seven microphones 101*a*, 101*b*, 101*c*, 101*e*, 101*f* and 101*g*, a signal processor 102 and a controller 103.

The seven microphones are arranged side by side. With regard to the microphone 101*d*, the microphones 101*a* and 101*g*, microphones 101*b* and 101*f*, and microphones 101*c* and 101*e* are arranged in symmetrical positions. The interval between the microphones 101*a* and 101*d* and the interval between the microphones 101*g* and 101*d* are each 10 cm. The interval between the microphones 101*b* and 101*d* and the interval between the microphones 101*f* and 101*d* are each 5 cm. The interval between the microphones 101*c* and 101*d* and the interval between the microphones 101*e* and 101*d* are each 2.5 cm. That is, a set of microphones 101*a*, 101*d* and 101*g* can be operated as microphones 101L, 101C and 101R with an interval of 10 cm. Similarly, a set of microphones 101*b*, 101*d* and 101*f* can be operated as microphones 101L, 101C and 101R with an interval of 5 cm. Similarly, a set of microphones 101*c*, 101*d* and 101*e* can be operated as microphones 101L, 101C and 101R with an interval of 2.5 cm.

The signal processor 102 in the second embodiment includes three different acoustic filters. The three acoustic filters include a 500 Hz filter 1021*a* corresponding to a microphone interval of 10 cm, a 1000 Hz filter 1021*b* corresponding to a microphone interval of 5 cm and a 2000 Hz filter 1021*c* corresponding to a microphone interval of 2.5 cm. The 500 Hz filter 1021*a* is supplied with a microphone acquisition signal from each of the microphones 101*a*, 101*d* and 101*g*. The 1000 Hz filter 1021*b* is supplied with a microphone acquisition signal from each of the microphones 101*b*, 101*d* and 101*f*. The 2000 Hz filter 1021*c* is supplied with a microphone acquisition signal from each of the microphones 101*c*, 101*d* and 101*e*.

The acoustic filter factors qL1, qC1 and qR1 of the 500 Hz filter 1021*a* are calculated according to equation (9) using a transfer function DLj1 between the sensitization control point and microphone 101*a*, a transfer function DCj1 between the sensitization control point and microphone 101*d* and a transfer function DRj1 between the sensitization control point and microphone 101*g* under the conditions that the microphone interval is 10 cm and the frequency of a sound source is 500 Hz. Similarly, the acoustic filter factors qL2, qC2 and qR2 of the 1000 Hz filter 1021*b* are calculated according to equation (9) using a transfer function DLj2 between the sensitization control point and microphone 101*b*, a transfer function DCj2 between the sensitization control point and microphone 101*d* and a transfer function DRj2 between the sensitization control point and microphone 101*f* under the conditions that the microphone interval is 5 cm and the frequency of the sound source is 1000 Hz. Similarly, the acoustic filter factors qL3, qC3 and qR3 of the 2000 Hz filter 1021*c* are calculated according to equation (9) using a transfer function DLj3 between the sensitization control point and microphone 101*c*, a transfer function DCj3 between the sensitization control point and microphone 101_d_ and a transfer function DRj3 between the sensitization control point and microphone 101_e_ under the conditions that the microphone interval is 2.5 cm and the frequency of the sound source is 2000 Hz. Since the kd values of the 500 Hz filter 1021_a_, 1000 Hz filter 1021_b_ and 2000 Hz filter 1021_c_ are constant, the same sound pressure sensitivity distribution is obtained.

The microphone acquisition signal filtered by each of the 500 Hz filter 1021_a_, 1000 Hz filter 1021_b_ and 2000 Hz filter 1021_c_ is input to the controller 103. The position estimation unit 1035 of the controller 103 adds the microphone acquisition signals filtered by the 500 Hz filter 1021_a_, 1000 Hz filter 1021_b_ and 2000 Hz filter 1021_c_ to estimate the position of the sound source using the added microphone acquisition signals.

As described above, according to the second embodiment, sounds are picked up simultaneously by microphones with a plurality of microphone intervals. This widens the frequency band capable of forming a gradient of sound pressure sensitivity.

In the example of FIG. 10, there are three different microphone intervals of 2.5 cm, 5 cm and 10 cm. However, the microphone interval is not limited to these values. That is, the number of microphone intervals may be two and four or more. Since the microphones are smaller than the speakers, they can be spaced less than 2.5 cm apart and spaced more widely. In other words, the microphones tend to have a wider band than the speakers.

Modifications

Figure 11:
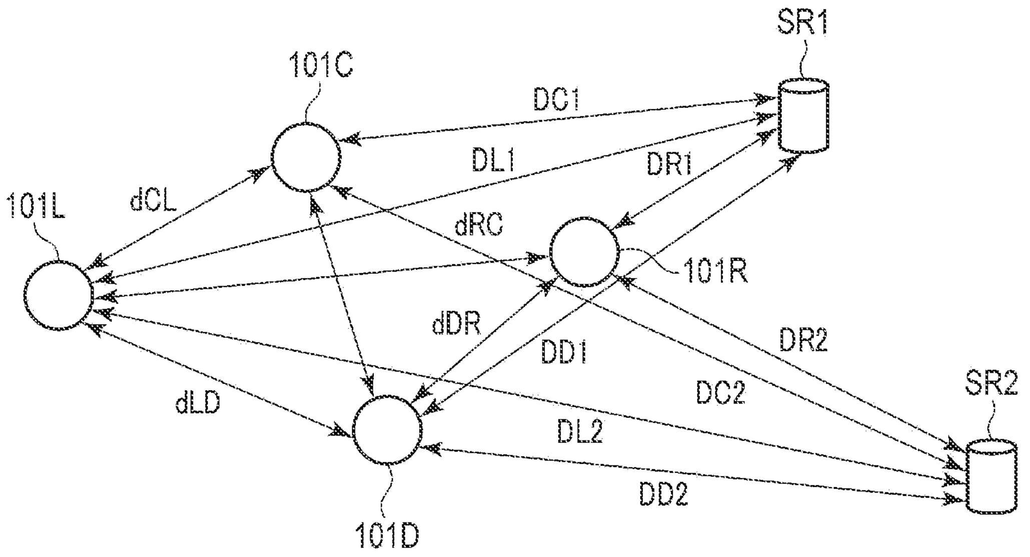
FIG. 11 is a diagram showing an example of setting sensitization control points when the number of microphones is four.

In the foregoing embodiments, three microphones are used for sensitization control and desensitization control. However, the number of microphones has only to be two or more. In particular, if the number of microphones is three or more, the number of sensitization control points can be set to two or more. Specifically, if the number of microphones is m, the number of sensitization control points may be (m−1). FIG. 11 is a diagram showing an example of setting sensitization control points when the number of microphones is four. In FIG. 11, four microphones 101L, 101C, 101R and 101D are located in four positions of the top, bottom, right and left. When viewed from the right microphone 101R, two sound sources SR1 and SR2 are located in the top right position and bottom right position, respectively.

Even in the above cases, the acoustic filter factors qL, qc, qR and qD for the microphones 101L, 101C, 101R and 101D can be calculated from the microphone intervals dCL, dRC, dDR and dLD between the respective microphones, the frequencies of the sound sources, the transfer functions DL1, DC1, DR1 and DD1 between the microphones 101L, 101C, 101R and 101D and the sensitization control point, i.e., the sound source SR1, and the transfer functions DL2, DC2, DR2 and DD2 between the microphones 101L, 101C, 101R and 101D and the sensitization control point, i.e., the sound source SR2.

Assuming here that there are two or more sensitization control points, these sensitization control points may be present in one sensitization area or in different sensitization areas. If two or more sensitization control points are present in one sensitization area, two or more sensitization control points may be sensitized by a common sensitization factor as described in the first embodiment, or may be sensitized by different sensitization factors. If there are, for example, three sensitization control points, a first sensitization control point with a sensitization factor of two may be set in one sensitization area, a second sensitization control point with a sensitization factor of 1 may be set behind the first sensitization control point, and a third sensitization control point with a sensitization factor of 0.1 may be set further behind the second sensitization control point. In this case, a gradient of sound pressure levels may occur even within a single sensitization area. If a plurality of sensitization control points are sensitized by different sensitization factors, equations (2) and (3) can be calculated for their respective sensitization control point. In this way, a variety of sound pressure sensitivity distributions can be designed by setting the position, number and factor of the sensitization control points.

Figure 12:
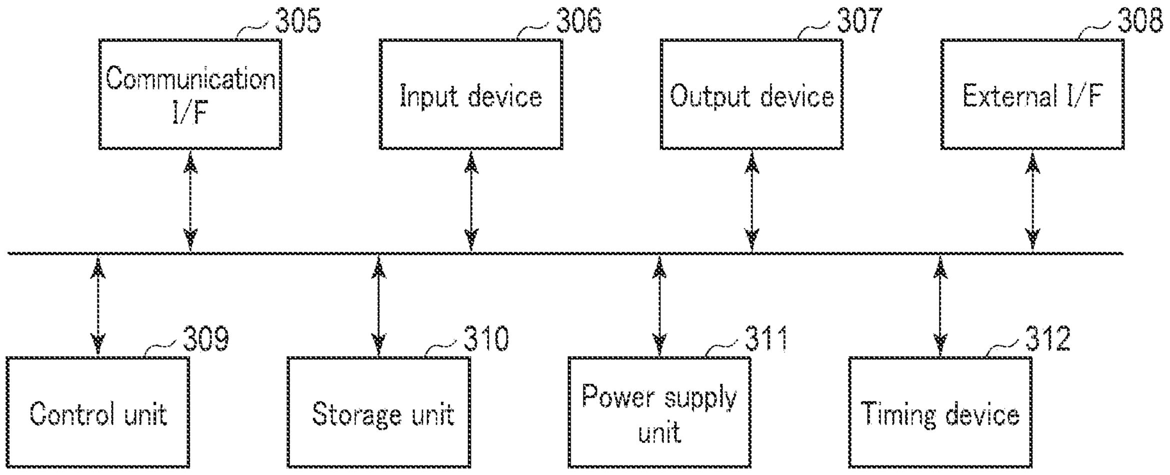
FIG. 12 is a diagram showing an example of a hardware configuration of a sound pickup device.

An example of a hardware configuration of the sound pickup device 100 described in each of the embodiments will be described with reference to FIG. 12. FIG. 12 is a diagram showing an example of the hardware configuration of the sound pickup device 100.

As shown in FIG. 12, the sound pickup device includes a computer to which a control unit 309, a storage unit 310, a power supply unit 311, a timing device 312, a communication interface (I/F) 305, an input unit 306, an output device 307 and an external interface (I/F) 308 are electrically connected.

The control unit 309 includes, for example, a central processing unit (CPU), a random access memory (RAM) and/or a read-only memory (ROM) to controls each component in response to information processing. The controller 309 may operate as the signal processor 102 and controller 103. The control unit 309 can invoke an execution program from the storage unit 310 to perform a process.

The storage unit 310 is a medium that stores information such as programs so that computers, machines and the like can read the information. In addition, the storage unit 310 can store information on the microphone intervals, information on the frequencies of the sound sources and information on the transfer functions. The storage unit 310 can be an auxiliary storage device such as a hard disk drive and a solid state drive. The storage unit 310 may include a drive. The drive is a device that reads data from another auxiliary storage device, a recording medium, and the like, and includes, for example, a semiconductor memory drive (flash memory drive), a compact disk (CD) drive, a digital versatile disk (DVD) drive, and the like. The type of drive may appropriately be selected according to the type of storage medium.

The power supply unit 311 supplies power to each component of the sound pickup device 100. The power supply unit 311 may further supply power to each component of a device including the sound pickup device 100. The power supply unit 311 may include, for example, a secondary battery or an AC power supply.

The timing device 312 measures time. For example, the timing device 312 may be a clock containing a calendar, which transfers information of the current year, month and/or date and time to the control unit 309. The timing device 312 may be used to add date and time to an audio signal of the picked-up sounds.

The communication interface 305 is, for example, a close-range wireless communication (for example, Bluetooth (registered trademark)) module, a wired local area network (LAN) module, and a wireless LAN module to perform wired or wireless communication via a network. Communication over the network may be performed wirelessly or by wire. Note that the network may be an internetwork including the Internet or another type of network such as an in-house LAN. The communication interface 305 may also perform one-to-one communication using a universal serial bus (USB) cable or the like. The communication interface 305 may also include a micro USB connector. The communication interface 305 is connected to the external device such as various communication devices. The communication interface 305 is controlled by the control unit 309 and receives various information items from an external device via a network or the like. The various information items include information on the microphone intervals, information on the frequencies of the sound sources, and information on the transfer functions, which are set in the external device, for example.

The input unit 306 is a device that receives information and can be, for example, a touch panel, a physical button, a mouse, and a keyboard. The input unit 306 also includes, for example, three microphones that operate as the microphones 101L, 101C and 101R. The output device 307 is a device that outputs information by display, voice, etc., such as a display and a speaker. The information on the microphone intervals, the frequencies of the sound sources and the transfer functions may be input thorough the input unit 306.

The external interface 308 mediates between the body of the sound pickup device and the external device. The external devices may include, for example, a printer, a memory and a communication device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sound pickup device comprising a processor with hardware, configured to:

calculate a first relational expression between acoustic filter factors of acoustic filters applied to microphone acquisition signals acquired by two or more microphones, based on a multiplication factor at a sensitization control point with high sound pressure sensitivity by the two or more microphones and a transfer function between each of the two or more microphones and the sensitization control point;

calculate a second relational expression between the acoustic filter factors, based on information of a frequency of a sound source and an interval between the two or more microphones; and calculate each of the acoustic filter factors, based on the first relational expression and the second relational expression.

2. The sound pickup device of claim 1, wherein the processor calculates the second relational expression such that acoustic power is minimized when the two or more microphones are regarded as two or more speakers.

3. The sound pickup device of claim 1, wherein the processor estimates a position of the sound source based on the microphone acquisition signals to which the acoustic filters are applied.

4. The sound pickup device according to claim 3, wherein the processor estimates a highest sound pressure level in the microphone acquisition signals to which the acoustic filters are applied as a position of the sound source.

5. The sound pickup device of claim 1, wherein:

the two or more microphones include a plurality of sets of microphones with different intervals; and the processor calculates acoustic filter factors for the sets of microphones and adds up microphone acquisition signals to which the acoustic filter factors calculated for the sets of microphones are applied.

6. A non-transitory computer readable medium that stores a sound pickup program to cause a computer of a sound pickup device to:

calculate a first relational expression between acoustic filter factors of acoustic filters applied to microphone acquisition signals acquired by two or more microphones, based on a multiplication factor at a sensitization control point with high sound pressure sensitivity by the two or more microphones and a transfer function between each of the two or more microphones and the sensitization control point;

calculate a second relational expression between the acoustic filter factors, based on information of a frequency of a sound source and an interval between the two or more microphones; and calculate each of the acoustic filter factors, based on the first relational expression and the second relational expression.

7. A sound pickup method comprising:

calculating a first relational expression between acoustic filter factors of acoustic filters applied to microphone acquisition signals acquired by two or more microphones, based on a multiplication factor at a sensitization control point with high sound pressure sensitivity by the two or more microphones and a transfer function between each of the two or more microphones and the sensitization control point;

calculating a second relational expression between the acoustic filter factors, based on information of a frequency of a sound source and an interval between the two or more microphones; and calculating each of the acoustic filter factors, based on the first relational expression and the second relational expression.

* * * * *